May 23, 1967  R. LUCAS  3,320,722
MOLECULAR FRACTIONATION OF GASEOUS MIXTURES
Filed March 11, 1964
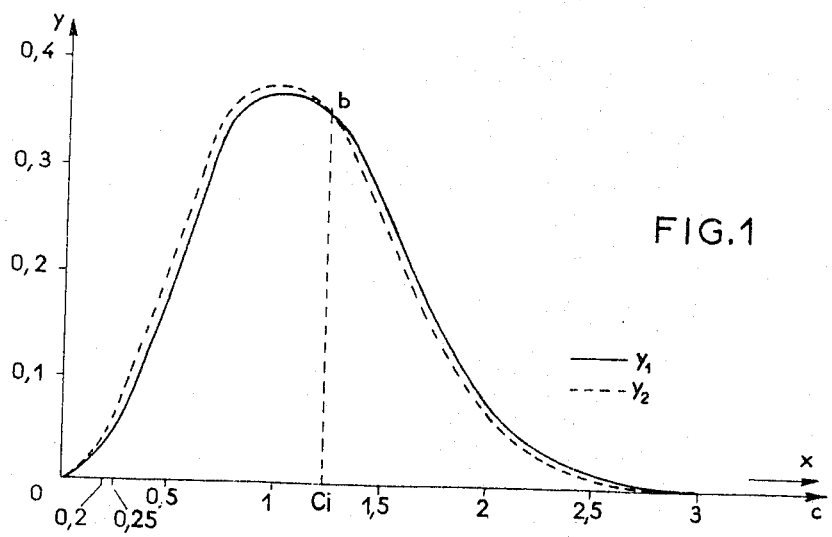
FIG.1
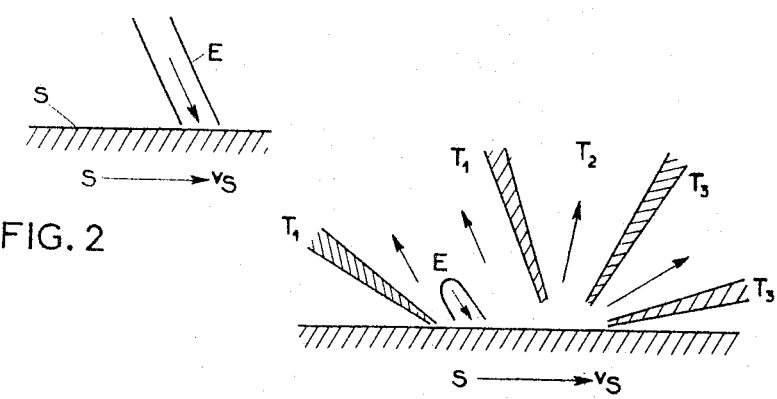
FIG.2
FIG.3
FIG.4
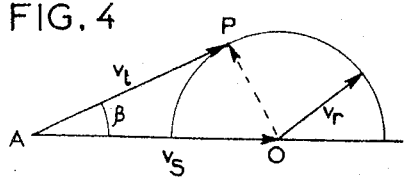
INVENTOR
RENÉ LUCAS, May 23, 1967 R. LUCAS 3,320,722
MOLECULAR FRACTIONATION OF GASEOUS MIXTURES
Filed March 11, 1964 2 Sheets-Sheet 2

INVENTOR
RENÉ LUCAS,

BY Youngblood, Melville, Strasser & Foster

ATTORNEYS

United States Patent Office 3,320,722
Patented May 23, 1967

3,320,722
MOLECULAR FRACTIONATION OF GASEOUS MIXTURES
René Lucas, Paris, France, assignor to Etablissement Public: Centre National de la Recherche Scientifique, Paris, France, a corporation of France
Filed Mar. 11, 1964, Ser. No. 351,007
Claims priority, application France, Mar. 3, 1964, 965,899
14 Claims. (Cl. 55—17)

The present invention relates to a method for the separation of a mixture of molecules of different masses, in the gaseous or vapour state, through diffusion on a mobile wall.

The invention also relates to a device for carrying such a process into effect.

The process according to the invention consists in effecting a classification of the molecules of a gaseous mixture in thermodynamic balance, according to categories of the translation speeds of their thermal agitation, by introducing onto a mobile wall at least one molecular jet of said mixture whereby a gaseous mixture diffused by said surface is obtained wherein the molecular speeds obey Maxwell's distribution law, and by trapping, on both sides of the mean axis of said molecular jet and adjacent said mobile surface, the diffused mixture fractions wherein the molecules assume speeds based upon predetermined values corresponding to the theoretical enrichment ratio of said fractions.

The compositions of the selected fractions are different from that of the initial mixture and said fractions may be again subjected to separation in order to obtain a more complete separation of the constituents of the mixture.

The molecules of the initial mixture and of the separated fractions may be brought to temperatures such that the vapour tensions are lower than the residual pressure, so as to reduce the pumping operations.

The recovered mixtures of molecules may be recycled so as to obtain only mixtures presenting the desired enrichment coefficient.

The gaseous mixture may be fractioned in two parts, one comprising the molecules the translation speeds of which exceed the most probable average speed of the molecules of each species, the other comprising the molecules the translation speeds of which are lower than said average speed.

The separation of the gaseous mixture is effected, according to the invention, essentially in dependence of the value of the molecular speed components which are parallel to the direction of motion of the mobile diffusion surface or wall.

The molecular jet may be obtained by means of an ejector nozzle opening in the vicinity of a mobile wall, said nozzle being capable of assuming various inclined positions relative to said wall, whereas trapping nozzles located adjacent said wall, on both sides of the ejector nozzle, are adapted to receive the diffused molecules leaving said wall, said trapping nozzles being arranged in sloped relationship to said wall, according to their enrichment factor. The slope of the ejector nozzle feeding the mobile surface may be selected in such a manner that the molecules diffused by the surface and projected through said nozzle form a mixture having substantially the same composition as that of the mixture to be separated.

Considering now a mobile surface or wall, moving in the direction of a vector $\vec{V}$, and if a molecular gaseous jet of a binary mixture comprising both heavy and light molecules, is applied in a direction substantially perpendicular to said wall, the novel phenomenon on which the method according to the invention, namely that the space dihedron upstream in the direction of vector $\vec{V}$ with respect to the perpendicular to the surface is enriched with light molecules, whereas the downstream dihedron is enriched with heavy molecules, may be verified by the kinetic theory of gases.

A device for carrying out the process of the invention consists essentially of a mobile wall in a closed enclosure maintained under vacuum, the travelling speed thereof being of the same order of magnitude as the speed of the average molecular agitation of the gaseous mixture to be separated, and of at least one set of three nozzles located on the same side of the wall and including a central nozzle opening substantially perpendicularly to said mobile wall and two lateral nozzles inclined with respect to the perpendicular direction to said surface and arranged on both sides of the central nozzle in the direction of movement of said surface, each of said side nozzles communicating with evacuating means through trap members, said central nozzle communicating with means for feeding the initial gaseous mixture under reduced pressure therethrough, additional means being provided to cause the gaseous mixture to be continuously circulated under partial vacuum.

According to a preferred embodiment of the above mentioned device, the mobile surface includes a rotary disc member moving in a stator comprising for instance, two flanges, and forming a chamber maintained under vacuum.

The clearance between the rotor and each of said flanges is preferably small, account being however taken of the value of the average free path of the molecules under the conditions of partial vacuum in the chamber. Said clearance may however be substantially greater than the rotor-stator distances of the known molecular pumps, which are smaller than, or equal to one-hundredth of a millimeter. According to the invention, a much greater stator-rotor clearance may be used, ranging from a few hundredths to a few tenths of a millimeter, the provision of such clearances presenting practically no difficulty.

Several sets of three nozzle assemblies may be provided on one and/or both sides of the rotary disc. According to a particularly desirable embodiment of the invention, the nozzle sets are distributed on one side of the disc substantially on the same internal circle thereof, and, on the other side, on an inner circle, symmetrical or not with the previous one relative to the mean plane of the disc.

The invention and an embodiment of a device for carrying out the same are described in detail hereinafter, reference being made to the appended drawings, wherein:

FIGURE 1 is a set of curves illustrating the relative number of molecules in a given mixture, the translation speeds of which are comprised between given limits.

FIGURES 2 to 4 are diagrams illustrating the process of the invention.

Figure 5:
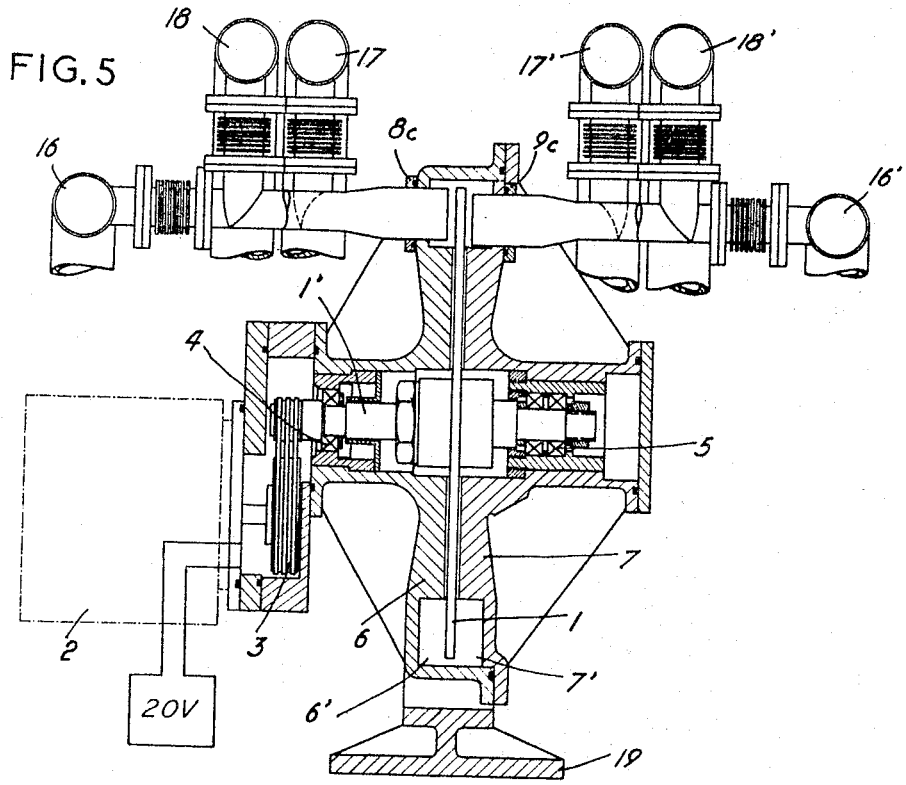
FIGURE 5 is a vertical cross-sectional view of an embodiment of a device according to the invention.

The process of the invention is the following:

The molecules to be separated being in a state of thermodynamic equilibrium, the process consists in trapping the molecules of the mixture the thermal agitation translation speeds of which are comprised between suitably selected values or exceed a predetermined value:

This process takes advantage of Maxwell's distribution laws of the translation speeds of the molecules constituting a binary mixture in a state of thermodynamic equilibrium.

Assuming $M_1$ and $M_2$ ($M_2 > M_1$) to be the molecular weights of the considered molecules, at an absolute temperature T, and $n_1$ and $n_2$ the number of molecules of each species in the mixture, the curves $Y_1$ and $Y_2$ in FIGURE 1 represent, respectively, the relative numbers of molecules $\delta n_1/n_1$ and $\delta n_2/n_2$, the translation speeds of which are comprised between the values $c$ and $c+\delta c$; the quantities:

$$Y_1 = \frac{\delta n_1}{n_1 \delta c}$$

and $$Y_2 = \frac{\delta n_2}{n_2 \delta c}$$

being plotted on the ordinates and the translation speeds $c$ on the abscissae. It should be noted that the curves $Y_1$ (full line) and $Y_2$ (dotted line) derive from the kinetic theory of the gases and may be plotted, if required, for all cases of binary mixtures of molecules.

If molecules are trapped, the speeds of which are comprised between $c$ and $c+\delta c$, the ratio $\delta n_1/\delta n_2$ of the number of molecules is given by the following relation:

$$\frac{\delta n_1}{\delta n_2} = \frac{n_1}{n_2}\left(\frac{M_1}{M_2}\right)^{3/2} \times e^{\frac{M_2-M_1}{2RT}c^2}$$

where R designates the molecular constant of perfect gases.

The ratio $$\frac{Y_1}{Y_2} = \frac{\frac{\delta n_1}{\delta n_2}}{\frac{\delta n_1}{\delta n_2}}$$

which is the factor of enrichment in molecules of species 1 of the mixture ($\delta n_1$, $\delta n_2$) relative to the mixture ($n_1$, $n_2$) has the following value:

$$\left(\frac{M_1}{M_2}\right)^{3/2} e^{\frac{(M_2-M_1)}{2RT}c^2}$$

For the values of $c$ lower than that corresponding to the intersection (point $b$) of curves $Y_1$ and $Y_2$, the enrichment factor is smaller than one; it is equal to one for the speed corresponding to the condition $Y_1 = Y_2$ and becomes greater than one (and gradually greater) for the higher values of $c$.

If, instead of dealing with a small interval ($c$, $c+\delta c$) of speeds, one considers, for instance, the composition of the mixtures of molecules of species 1 and 2 the speeds of which exceed the value $c_i$ (the projection of a line from $b$ to the abscissa) shown in FIGURE 1, the enrichment factor of the mixture of trapped molecules will be obtained by forming the ratio of the surface areas comprised between the curve $Y_1$ and line $Oc$, curve $Y_2$ and line $Oc$, respectively, and the vertical line at the value $c_i$ of speed $c$.

The enrichment factor in molecules of species 1 will thus be:

$$a = \frac{\int_{c_i}^{\infty} Y_1 dc}{\int_{c_i}^{\infty} Y_2 dc}$$

This enrichment factor $a$ may reach substantially higher values than that corresponding to the use of the phenomenon diffusion through small orifices, such as provided by a porous wall. Thus, for a mixture of molecules the weights of which are closely adjacent as to their relative value, by selecting:

$$c_i = 2\sqrt{\frac{2RT}{M_2}}$$

i.e. twice the statistically most probable speed for the molecules $M_2$ and setting, $$\frac{\delta M}{M} = \frac{M_2 - M_1}{M}$$

with M being the mean value $$(M_1 + M_2)/2$$

calculation shows that the enrichment factor obtained according to the invention is substantially:

$$a = 1 + \frac{1}{2} \times \frac{\delta M}{M} \times 7.1$$

instead of $$a' = 1 + \frac{1}{2} \times \frac{\delta M}{M}$$

provided by diffusion through small orifices. Factor $a$ increases moreover rapidly with the increasing values of $c_i/c_p$ where $c_p$ is the value of the most probable average speed of the gaseous mixture.

Mixtures depleted in molecules of species 1 may thus be obtained by trapping the molecules the speeds of which are comprised between zero and a value smaller than that corresponding, for instance, to intersection point $b$ of curves $Y_1$ and $Y_2$.

For the practical operation of the above described process, any device may be used by means of which the isolation of the molecules the translation speeds of which are comprised betwen values determined as above explained.

For instance (FIG. 1), three ranges of speed values $c$ may be defined, comprised between the following limits:

$$\infty > c > c', \quad c' > c > c'', \quad c'' > c > 0$$

to which correspond the following enrichment factors:

$$a_1 = \frac{\int_{c'}^{\infty} Y_1 dc}{\int_{c'}^{\infty} Y_2 dc} \qquad a_2 = \frac{\int_{c'}^{c''} Y_1 dc}{\int_{c'}^{c''} Y_2 dc}$$

$$a_3 = \frac{\int_0^{c''} Y_1 dc}{\int_0^{c''} Y_2 dc}$$

Selecting for instance:

$$a_1 > 1 \quad a_2 = 1 \quad a_3 < 1$$

the isolated intermediate mixture, of the same composition as the initial mixture, may be added again to said initial mixture for a new treatment. Ultimately, the operation will result in isolating a fraction enriched by a factor $a_1$ and a fraction depleted (in light molecules) by a factor $a_3$ without intermediate fractions.

The process of the invention will now be diagramatically described as applied to a mobile diffusion surface.

A nozzle assembly E (FIGURE 2) opens in the vicinity of a movable solid surface S receiving the molecules of a gaseous mixture issued from said nozzle, whereby the gaseous molecules are deflected by surface S. After contacting said surface, the molecules which leave said surface have a speed component $V_S$ equal to that of the mobile surface S.

According to the direction of nozzle $T_1$ (FIGURE 3) which traps part of the molecules leaving the mobile surface, only those molecules will be able to penetrate into said nozzle the speeds $v_r$ of which (FIGURE 4) with respect to surface S, when composed with speed $v_S$ provide a resultant $v_t$ having a direction favourable to their penetrating into nozzle $T_1$.

If, for simplification purposes, those molecules are considered, the speeds of which are in the plane of FIGURE 3 (or 4), designating by $v_r$ the speed of such molecules in a reference system bound to surface S, the new orientation of the resultant speed $v_t$ will be obtained by means of the geometric sum $\vec{v_t}=\vec{v_r}+\vec{v_s}$.

As will be readily seen, if $v_s$ is greater than $v_r$, the maximum angle formed by $v_t$ with surface S is the angle $\beta$ such that $$\beta = \frac{v_r}{v_s}$$

It is possible to adjust the orientation of the trapping nozzle $T_1$ in such a manner that only molecules with speeds exceeding $v_r$ will be accepted. For this to happen, it is sufficient that the angle formed by the inlet surface of nozzle $T_1$ with surface S be equal to angle $\beta$ $$\vec{OP}=v_r \quad \vec{AO}=v_s$$

If $v_s$ is selected greater than a certain value, the molecules collected by nozzle $T_1$ will be enriched in a desirable ratio of light molecules when nozzle E applies to surface S a flux of molecules of different weights.

The same rule of composition shows that the molecules having a low speed value $v_r$, when leaving the mobile surface, will have a resultant speed $v_t$ which tends to bring them angularly nearer to $v_s$, so much the more as $v_s$ is substantially greater than $v_r$. Due to this, a suitably arranged nozzle $T_3$ (FIGURE 3) will trap a mixture richer in molecules of low $v_r$ value (and, consequently, in heavy molecules) than nozzle $T_1$.

It is finally possible to arrange a nozzle $T_2$ the function of which will be to trap a group of molecules having the same composition as that of the initial mixture. Under these conditions, the recovered mixture may be recycled so as to possess, ultimately, only the mixture enriched in light molecules (trapped by $T_1$) and the mixture enriched in heavy molecules trapped by $T_3$).

In order for the enrichment factor to be of practical interest (and substantially higher than $$1+\frac{1}{2}\times\frac{\delta M}{M})$$

it is sufficient that speed $v_s$ be higher than speed $c_p$, $$c_p=\sqrt{\frac{2RT}{M_1}}$$

(being the most probable speed for one of the types of molecules).

With molecular weights of the order of 300 to 400, and for temperatures of the order of 300° K., this leads to speeds $c_p$ of the order of 130 meters per second. It is perfectly possible to impart to solid surfaces such as discs, cylinders, etc., peripheral speeds which are substantially higher, i.e. to obtain the most favourable conditions for taking advantage of the condition $v_s > c_p$.

The device illustrated in FIGURE 5 comprises a smooth disc 1 bound to a shaft 1' which is driven by a motor 2 through a transmission gear 3, and journalled in bearings 4, 5. Dics 1 rotates between two flanges 6 and 7 with a clearance which may vary between five-hundredths and one-tenth of a millimeter. In the peripheral region of the disc, the two flanges form a circular channel 6', 7' of rectangular cross-section, the function of which is explained hereinafter. The device rests upon a frame 19.

On five rectangular openings provided in each of said flanges 6 and 7 and spaced on a circle the radius of which is the mean radius of channels 6' and 7' are adapted five flanges 8 and 9, namely 8a, 8b, 8c, 8d, 8e on flange 6 (FIGURE 7) and 9a, 9b, 9c, 9d, 9e on flange 7.

Figure 6:
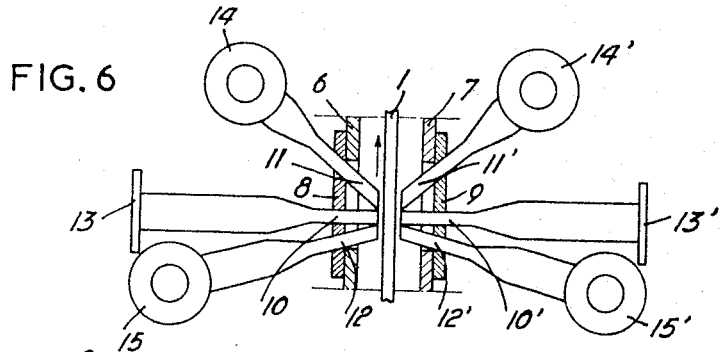
FIGURE 6 is a detail view of the embodiment of FIGURE 5, showing two sets of nozzle assemblies on both sides of the rotor.

Each flange 8 carries three nozzles 10, 11, 12 (FIG. 6) and each flange 9 carries three nozzles 10', 11', 12'. The common axis of nozzles 10, 10' is substantially perpendicular to the plane of disc 1, while nozzles 11, 12, 11', 12' are inclined, respectively, on both sides of the central nozzles 10 and 10'.

The side nozzles 11, 12, 11', 12' emerge in close vicinity of the central nozzle 10, 10'. As above mentioned, the cross-sections of the said nozzles are preferably rectangular, the large dimension of the rectangle being oriented perpendicular to the speed component of the wall or disc. Each nozzle 10 or 10' is connected to a pipe 13 or 13' respectively.

The upstream nozzles 12, 12', as seen in the direction of motion of disc 1 (arrow in FIGURE 6) are connected, respectively, to pipes 15 and 15', whereas the downstream nozzles 11 and 11' communicate with pipes 14 and 14'.

The pipes having the same function are connected to a common manifold. Thus all pipes 13 and 13' are connected to manifolds 16, 16' respectively, pipes 14 and 14' to manifolds 17, 17' respectively, and pipes 15 and 15' to manifolds 18, 18', respectively (FIG. 5). Manifolds 17, 17' and 18, 18' corresponding to the lateral nozzles in each group of nozzles are connected with respective primary vacuum pumps, shown diagrammatically as 17v and 18v, which may be of the vane type, whereas manifolds 16, 16' are connected with a source of a gaseous mixture. The gas to be separated is thus fed under reduced pressure onto disc 1.

The fractions enriched with heavy molecules trapped in each nozzle 11, 11' and corresponding pipe 14, 14' are collected in manifolds 17, 17' and fall into traps (not shown) arranged in said conduits upstream the vacuum pumps. Similarly, the fractions enriched with light molecules trapped in each of the pipes 15, 15' collect in conduits 18, 18' and are trapped in traps (not shown) interposed between the manifolds and the corresponding vacuum pump.

Figure 7:
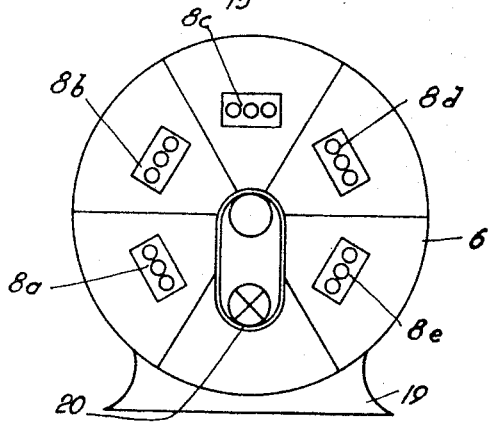
FIGURE 7 is a front elevational view of the arrangement of the nozzle assemblies on one of the sides of the rotor of the device illustrated in FIGURE 5.

In practice, and in order to ensure the correct circulation of the gaseous mixture, means are also provided to produce a vacuum in the space comprised between flanges 6 and 7 and the driving mechanism of disc 1. A pipe 20, opening in the casing of said driving mechanism, as shown at FIGURE 7, is connected to an additional primary vacuum pump (not shown). Owing to the small clearance provided between disc 1 and flanges 6, 7 elsewhere than in conduits 6', 7', on one hand, and between the rotating shaft 1' and bearings 4, 5, on the other hand, a slight overpressure is maintained in that portion of the device which does not, in fact, play any part in the separation of the gaseous molecules and which includes, in particular, the casing of motor 2 and gear-box 4. It will be understood that no external means are provided for maintaining this slight overpressure. The overpressure is generated by itself in the device owing to the small play existing between disc 1 and the flanges 6, 7, and between the rotating shaft and the bearings. These operate in practice, as baffle plates which prevent the complete evacuation of these parts of the equipment. The penetration of the gas to be fractioned into the moving mechanical devices is thus avoided, which is essential when dealing with a corrosive gas.

The device according to the invention may, indeed, be applied with advantage to the fractionation of isotopic gaseous mixtures, such as mercury vapours or uranium hexafluoride. For such applications, all the elements of the device are protected against corrosion.

By way of example, the values of the most probable molecular speed of the isotopic gaseous mixtures are substantially equal:

To 160 m. per second for mercury
To 125–130 m. per second, for uranium hexafluoride.

As hereinabove mentioned, the mobile surface used in the process according to the invention has a translation speed of the same order as, and preferably exceeding that, of the most probable average speed of the gaseous mixture. This may be readily achieved with the previously described device, since a disc 1 of 400 millimeters of diameter, rotating at about 9000 r.m.p., provides an average tangential speed of 150 meters per second.

It is clear that the above described device, may be modified in various aspects, for instance, by changing the number and the distribution of the nozzle groups on the rotary disc, or by adding recycling by-pass means for the enriched gases, without departing from the spirit and scope of the invention as defined by the following claims.

What I claim is:

1. A process for the separation of a gaseous mixture in a state of thermodynamic equilibrium, wherein the gaseous constituents possess different molecular weights and translation speeds, comprising the steps of directing said gaseous mixture through a conduit in the form of a jet at high velocities and in a substantially direct path against a highly mobile surface, said conduit outlet being located in close proximity to said surface to cause deflection thereof into enriched fractions, and separately trapping and removing said fractions of the mixture near the jet source.

2. A process according to claim 1, in which the selected fractions of the deflected gaseous mixture, which have compositions differing from that of the initial mixture, are again fractionated, to complete the separation of the mixture.

3. A process according to claim 1, in which the molecules of the initial mixture and of the separated fractions are brought to temperatures such that their vapour pressure is lower than the residual pressure.

4. A process according to claim 1, in which the gaseous mixture is fractionated into two parts, one comprising the molecules the translation speeds of which exceed the most probable average speed of the molecules of said gaseous mixture, the other part comprising the molecules the translation speeds of which are lower than said average speed.

5. A process according to claim 1, in which the gaseous jet is obtained by means of an ejector nozzle, said nozzle being adapted to have different sloping positions relative to said surface, and said trapping being carried out in the vicinity of the surface on both sides of the ejector nozzle to receive the deflected molecules leaving the mobile wall.

6. A device for the separation of gaseous mixtures comprising:
    (a) a housing defining a chamber therein for the containment of a mobile wall,
    (b) vacuum means communicating with said chamber,
    (c) a mobile wall mounted in said chamber for movement therein,
    (d) means for providing movement of said wall,
    (e) a group of at least three nozzles located in substantially a common plane on one side of said wall, whereby the central nozzle is directed perpendicular to said wall and opens closely adjacent thereto, the others being inclined relative to the perpendicular,
    (f) means connected to said central nozzle for supplying a gaseous mixture to said chamber, and
    (g) means connected to said remaining nozzles to remove said trapped portions of the mixture.

7. The device claimed in claim 6 wherein said wall is disc shaped and rotatively mounted in said chamber, and adapted to move in close proximity to two chamber defining walls.

8. The device claimed in claim 7 including at least one additional group of three nozzles on at least one of the sides of said disc.

9. The device claimed in claim 8, in which the nozzle groups are spaced substantially along an inner circle of the disc.

10. The device claimed in claim 6 in which the cross sections of said nozzles are rectangular, the larger dimension of the rectangle being oriented perpendicular to the direction of movement of the wall.

11. The device claimed in claim 6 including a manifold connected to all nozzles performing the same function.

12. The device claimed in claim 11 including a second manifold, the first connecting all central gas ejecting nozzles, the second manifold connecting said vacuum means with the trapping nozzles.

13. The device claimed in claim 7 including a second vacuum means.

14. The device claimed in claim 7 wherein flanged extensions of the chamber defining walls form a closed circular channel with which said nozzles communicate.

References Cited by the Examiner

UNITED STATES PATENTS

| | | | |
|---|---|---|---|
| 717,963 | 1/1903 | Bardolle | 55—17 |
| 1,004,760 | 10/1911 | Fetzer | 55—17 |
| 2,081,406 | 5/1937 | Mazza | 55—17 X |
| 2,394,357 | 2/1946 | Beese | 55—17 |
| 2,950,778 | 8/1960 | Boettcher et al. | 55—17 |

FOREIGN PATENTS 730,442   5/1932   France.

REUBEN FRIEDMAN, *Primary Examiner.*

J. ADEE, *Assistant Examiner.*